United States Patent [19]

Fellmann et al.

[11] Patent Number: 4,845,069
[45] Date of Patent: Jul. 4, 1989

[54] POROUS AMORPHOUS METALLO PHOSPHATES PROCESS FOR PREPARING POROUS AMORPHOUS METALLO PHOSPHATES

[75] Inventors: Jere D. Fellmann, Livermore, Calif.; Horst G. Langer, Wayland, Mass.

[73] Assignee: The Dow Chemical Company, Midland, Mich.

[21] Appl. No.: 537,193

[22] Filed: Sep. 29, 1983

[51] Int. Cl.$^4$ ............................................. B01J 27/18
[52] U.S. Cl. ..................... 502/208; 502/162; 502/209; 502/210; 502/211; 502/213
[58] Field of Search ............... 502/162, 208, 209, 210, 502/211, 213

[56] References Cited

U.S. PATENT DOCUMENTS

| | | | |
|---|---|---|---|
| 2,801,190 | 7/1957 | Orthver et al. | 252/35 X |
| 2,817,577 | 12/1957 | Bathis | 423/306 X |
| 3,342,750 | 9/1967 | Kearby | 502/208 |
| 3,418,075 | 12/1968 | Piret | 423/305 |
| 3,497,464 | 2/1970 | Monroe et al. | 252/49.7 X |
| 3,503,718 | 3/1970 | Riess et al. | 502/155 X |
| 3,751,556 | 8/1973 | Whitehead et al. | 423/305 X |
| 3,879,310 | 4/1975 | Rigge et al. | 502/208 |
| 4,059,669 | 11/1977 | Thomas | 423/314 X |
| 4,066,572 | 1/1978 | Choca | 502/211 X |
| 4,080,311 | 3/1978 | Kehl | 502/208 |
| 4,210,560 | 7/1980 | Kehl | 502/208 |
| 4,233,184 | 11/1980 | Cull | 502/213 |
| 4,310,440 | 1/1982 | Wilson et al. | 423/305 X |
| 4,376,067 | 3/1983 | Vogel et al. | 502/208 |
| 4,394,255 | 7/1983 | Kuken et al. | 502/208 X |
| 4,394,525 | 7/1983 | Vogel et al. | 502/213 X |

OTHER PUBLICATIONS

"The preporation of bystalline zirconiun phosphate and some observations on its ion exchange behavoir," Clearfield et al. Iroy. Nuci Chem 1964 vol. 26, pp. 117–129, Pergamon press Ltd. N. Ireland.

Russpan Translation #819112 Chechegoena et al. Method of preparing phosphorus-containing organo-al-compounds.

"Phosphates as Catalyst" Moffat Dept. of Chem. U. of Waterloo, Waterloo, Ontario Canada pp. 199-258.

Alumina-Alpo$_4$ or a large pore support . . . MAhcELin et al. J. of Cat. 83, 42–49 (1983).

Chem obst. 59:8900g.

Primary Examiner—W. J. Shine

[57] ABSTRACT

Amorphous, porous metallo phosphates wherein the metal is Al, Ti, Ba, Zr, Hf, V, Nb, Ta, Cr, Mo, W, Mg, Sc, Cu, Fe and La or mixtures thereof, having average pore diameter from about 5 Angstroms to about 50 Angstroms that are useful as catalysts and catalyst supports.

7 Claims, No Drawings

POROUS AMORPHOUS METALLO PHOSPHATES PROCESS FOR PREPARING POROUS AMORPHOUS METALLO PHOSPHATES

BACKGROUND OF THE INVENTION

The present invention relates to novel porous amorphous metallo phosphate materials. More particularly the present invention relates to materials comprising metal oxides and phosphorus oxide present as phosphate having very large surface areas and very narrow pore distributions. The compounds are stable solid materials finding use as molecular sieves, catalysts and as catalyst supports.

It has been previously known to prepare metallo phosphate compositions. Early work involved the mixing and calcining the solid mixtures of oxides or the acid treatment of metal oxides or mixtures thereof.

In U.S. Pat. No. 2,282,602, metallic oxides such as the oxides of copper, magnesium, iron, zinc, aluminum, tin and nickel were combined with phosphorus pentoxide and the solid mixture calcined at a temperature of about 600° C.-800° C. A chemical reaction was believed to occur in the mixture. In U.S. Pat. No. 2,330,115, bauxite was treated with a strong mineral acid such as phosphoric acid to produce an isomerization catalyst. Similarly, in U.S. Pat. No. 3,969,273 alumina and a phosphate compound such as phosphoric acid or ammonium phosphate were combined and calcined to yield a catalyst support for hydrocarbon conversion processes.

Alumino phosphate compositions having relatively large pore sizes have also been prepared by formation of gels or by coprecipitation followed by calcination. In U.S. Pat. No. 3,342,750, and alumninum phosphate gel was prepared by contacting aluminum chloride, phosphoric acid and ethylene oxide in an aqueous solution. The gel was then extracted with a low boiling alcohol to remove ethylene chlorohydrin and the resulting product calcined. Pore sizes were found to range from about 30 Angstrom units (A) to about 100 A. Later workers reported that substitution of 10 percent ammonia solution for ethylene oxide neutralizer resulted in aluminum phosphates of reduced surface area.

In U.S. Pat. No. 3,427,257, a catalyst system comprising vanadium oxide and an organic phosphorous oxy compound was described. The catalyst was employed in combination with an alkyl aluminum cocatalyst for the polymerization of ethylene.

U.S. Pat. No. 3,879,310, described the preparation of surface stabilized active alumina by incorporating small amounts of phosphate ion in pseudoboehmitic alumina. The stabilizer could be prepared by adding ammonium phosphate salts to a slurry of precipitated alumina. Upon heating during a thermal activation step, the phosphate salts decomposed to release volatile ammonia.

In U.S. Pat. No. 3,904,550, an alumina-aluminum phosphate material for use as a catalyst support was prepared by the reaction of an aluminum alkoxide with an aqueous solution containing phosphate ions. Suitable aqueous solutions included those of phosphoric or pyrophosphoric acid. After reaction to form a precipitate and impregnation with a catalytic metal, the materials were calcined.

In U.S. Pat. No. 4,066,572, inorganic aluminum salts and water-soluble phosphorus salts were coprecipitated by adjusting the solution pH to form an amorphous phosphate-alumina gel which upon calcination yielded catalysts and catalyst supports. The products were characterized by fairly large average pore diameters greater than 100 A. Less than 30 percent of the total pore volume consisted of pores less than 100 A.

In U.S. Pat. No. 4,080,311, thermally stable alumina-aluminum phosphate composite precipitates were prepared by forming an aqueous solution of aluminum cations and phosphate ions having phosphate/aluminum ratios within the narrow range of from 0.82:1 to 0.25:1. The solutions were subsequently neutralized with ammonia gas or a basic ammonium compound and the resulting precipitate calcined. The composite precipitate so formed had a surface area of from about 100 m$^2$/g to about 200 m$^2$/g and an average pore size from about 75 A to 150 A.

In U.S. Pat. No. 4,233,184, high surface area, amorphous, phosphate-alumina compositions were prepared by reacting aluminum alkoxides with organic phosphates in the presence of moist air. Upon calcination, relatively high surface area compositions having aluminum phosphate content from 10 to about 90 weight percent were prepared.

Efforts to provide high surface area aluminum phosphate materials with narrow distribution of pore sizes less than 100 A and particularly less than about 50 A have not been achieved by standard techniques of coprecipitation, extraction and calcination. Recently, however, E. M. Flanigen et al. reported the preparation of novel crystalline microporous alumino phosphate compositions by hydrothermal crystallization of alumino phosphate gels containing a molecular structure forming template. The compositions were found to possess uniform pores with dimensions from about 3 A to 10 A. The work is described in U.S. Pat. No. 4,310,440.

In U.S. Pat. No. 4,360,474, certain metal-containing derivatives of polyphosphoric acid partial esters were described. The materials were found to possess useful corrosion-inhibiting properties. As used herein, such materials prior to drying are referred to as metallo-organo phosphate gels.

SUMMARY OF THE INVENTION

According to the present invention there are provided novel amorphous metallo phosphate compositions of high surface area but having a narrow distribution of pore sizes of a relatively small pore diameter. Because the metal species affects the pore size of the resulting porous non-crystalline metallo phosphate composition of the invention, the average pore dimensions vary among individual species of the invention, but lie within the range of about 5 A to about 50 A. The compositions are prepared by extraction with base of partially hydrolyzed metallo-organo phosphate gels such as are preferred according to U.S. Pat. No. 4,360,474.

DETAILED DESCRIPTION OF THE INVENTION

The porous amorphous metallo phosphate-composition of the present invention are uniquely formed by the extraction of partially hydrolyzed metal derivatives of polyphosphoric acid partial esters such as are described in previously mentioned U.S. Pat. No. 4,360,474, the teaching of which is hereby incorporated by reference. By means of the partial hydrolysis prior to extraction of such compositions, extremely narrow channels or pores are formed throughout the solid. The present method of pore formation by hydrolysis and extraction of organic moieties of a metallo-organo phosphate gel leads to the selective formation of pores of relatively small diameter.

Metallo-organo phosphate compositions for use according to the present invention are compositions corresponding to the formula

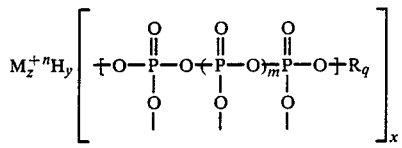

wherein M is a metallic species of valence n selected from the group consisting of Al, Ti, Ba, Zr, Hf, V, Nb, Ta, Cr, Mo, W, Mg, Sc, Cu, Fe and La and mixtures thereof; R is a hydrolyzable organic moiety selected from the group consisting of remnants formed by removal of a hydroxyl group from a monohydroxyl compound selected from the group consisting of
(a) (poly)alkylene glycol monoethers of up to about 20 carbons,
(b) phenol, and
(c) alcohols of up to about 20 carbons;
and n, z, y, q and x are all integers, n being from zero to five, y being greater than zero and q, x and z being greater than or equal to one, further selected such that $(z.n)+y=x(m+4-q)$ and $q \leq m+3.1$ Preferred compositions are those wherein M is aluminum and R is lower alkyl or an alkoxy-substituted alkyl group of up to about 10 carbons.

The metallo-organo phosphate composition may be prepared by any suitable method. According to one suitable process they are prepared by reaction of a metal organo compound with phosphorus pentoxide, phosphoric acid or other phosphate ion source. Preferred metal organo compounds are metal derivatives of (poly)glycol monoethers.

Alternatively, the metallo-organo phosphate composition may be prepared by reaction of a partial ester of pyrophosphoric acid with a metal oxide, elemental metal or metal salt having an anionic remnant that may be removed by volatilization under the reaction conditions employed. Also a mixture of such metal reactants may be employed. Examples of metal reactants having suitable anionic remnant include the carbonates, chlorides, lower alkoxides, acetates, etc. In the preparation of mixed metal compositions, each source of metal need not contain the same anionic remnant. During the course of the reaction, the anionic or counterionic remnant of the above species is removed as carbon dioxide, hydrogen chloride, lower alcohol, acetic acid, etc.

Once prepared, the metallo-organo phosphate composition, which is a complex network structure or gel, is contacted with water thereby partially hydrolyzing some of the metal-organo bonds of the composition.

Next, the partially hydrolyzed metallo-organo phosphate is extracted by contacting with a base. Suitable extractants include aqueous caustic or ammonium hydroxide solutions. Preferred extractants are ammonium hydroxide solutions that advantageously allow the removal of residual ammonia derivatives upon calcining of the completed product. As an option, the hydrolysis and extraction steps need not occur separately. By contacting the metallo-organo phosphate directly with aqueous base, the hydrolysis and extraction may be accomplised simultaneously.

In the metallo-organo phosphate compositions subjected to partial hydrolysis and extraction according to the present invention, there are several types of molecular bonds present, including bonds between the metal and an organyloxy moiety, i.e.,

M—OR, bonds between the metal and phosphate moieties, i.e.,

and bonds between organic moieties and phosphate moieties, i.e.,

Based upon studies of the reaction products obtained by hydrolysis and extraction of various metallo-organo phosphate compositions, it is presently believed without wishing to be found thereby, that partial hydrolysis by reaction with water according to the previously described process first causes degradation of aluminum organyloxy bonds thereby releasing the hydroxyl compound HOR. Continued hydrolysis results in degradation of metallo phosphate and organyl-phosphate bonds.

Uniquely, according to the present process, the hydrolysis and extraction of metal-organyloxy bonds is believed to result in the formation of relatively small diameter pores. On the other hand, hydrolysis and extraction of metal-phosphate bonds results in rather large diameter pore formation which is not as desirable according to the present invention. Therefore, by the term partial hydrolysis is meant the hydrolysis and severence from the structure of those constituents present in the metallo-organyl phosphate structure that produce pores of relatively small average diameter without concomitant hydrolysis of those constituents that lead to formation of relatively large diameter pores. By the term relatively small is meant pores of an average diameter such that about at least 50 percent of the pore volume is attributed to pores having a diameter less than 30 A. Preferably, about 50 percent of the pore volume is attributed to pores having a diameter less than about 20 A.

After hydrolysis and extraction, the resulting product may contain remnant organic functionality, most likely associated with phosphate functionality. Calcining of the resulting product generally removes remnant organic functionality and ammonia-containing derivatives remaining from the extraction process. Generally, heating to a temperature of about 300° C.–500° C., preferably 400° C.–450° C. for about at least ½ hour, preferably one hour with or without oxygen present, suffices to remove undesired organic remnants from the structure. The resulting product is an amorphous, porous, metallo phosphate substantially free of organic functionality.

By the term metallo phosphate is meant that both metal oxide and phosphate functionality exists in the structure but that a stoichiometric relationship need not necessarily exist between the amount of metal oxide and phosphate functionality present. The resulting composition is thought to possess repeating units of metal oxide functionality occasionally bridged or cross-linked between metal atoms with phosphate functionality. Accordingly, the elemental ratio of metal to phosphorus (M/P) in the compositions is generally greater than 1, most generally from about 2 to about 20. Clearly, those species of the present invention that have minor amounts of phosphate due to extraction thereof with base, could alternatively be referred to as aluminates, zirconates, ferrites, etc. In the interest of simplicity, such compositions are still referred to herein as metallo phosphates.

The amorphous porous metallo phosphates of the invention are generally present as particles in the size range from about 10-300 microns. Surface areas are from about 50 m²/g to about 600 m²/g, depending on the identity of the metal component. Porous amorphous alumino phosphate compositions of the present invention generally have surface areas from about 200 m²/g to about 600 m²/g. Calcination may result in some sintering and consequent loss of surface area in the final product.

The surface properties of the finished product may be altered or modified by doping or adding minor amounts of known elements, such as: boron, arsenic, phosphorus, alkali metal, or alkaline earth metals according to known techniques.

SPECIFIC EMBODIMENTS

Having described the invention, the following examples are provided as further illustrative and are not to be construed as limiting.

A metallo-organo phosphate that is not extracted is prepared to illustrate nonporous compositions not prepared according to the present invention.

The n-butoxyethoxy diester of diphosphoric acid is prepared for subsequent use by reacting 2 moles of 2-(n-butoxy)ethanol with $P_2O_5$. Accordingly, $P_2O_5$ (312.8 g, 2.20 moles) is suspended in 400 ml of $CH_2Cl_2$ under nitrogen atmosphere. To this mixture 2-(n-butoxy)ethanol (495.3 g, 4.19 moles) is slowly added so as to cause a gentle reflux. The reaction is allowed to continue at reflux temperature for about 24 hours. The reaction is then discontinued, the product decanted from unreacted $P_2O_5$ and the solvent removed under vacuum.

The aluminum trialkoxide of 2-(n-butoxy)ethanol is prepared according to the following technique. To dry 2-(n-butoxy)ethanol (118.2 g, 1 mole) are added aluminum turnings (6.75 g, 0.25 mole) in small increments at 150° C. After $H_2$ evolution ceases, the resulting gel (empirical formula $H[Al(OCH_2CH_2OC_4H_9)_4]$) is dissolved in dry toluene (150 ml) and added dropwise to a solution of the n-butoxyethoxy diester of diphosphoric acid prepared above (46.6 g). The resulting reaction mixture is stirred for about 15 hours and the solvent removed under vacuum. The product is a viscous, alumino organo phosphate gel.

Ten grams of the above prepared alumino-organo phosphate gel is hydrolyzed by adding to water (250 ml) and stirring for 3 hours. The solid product obtained is recovered by filtration and washed with water, then dried at 110° C. for 16 hours. The recovered material is an amorphous alumino phosphate. Yield—3.57 g, surface area—0.8 m²/g (100° C.) 3.8 m²/g (200° C., after BET pretreatment). The low surface area indicated little porosity existed.

EXAMPLES 1-8

The following examples illustrate compositions of the present invention prepared by extraction of hydrolyzed metallo phosphate compositions prepared substantially according to the above procedure. Accordingly, 5 g of dried hydrolyzed alumino organo phosphate gel is mixed with 100 ml of aqueous ammonium hydroxide having concentration as specififed in Table I. The mixture is stirred for 45 minutes, filtered and washed three times with 15-ml aliquots of water. After drying at 100° C. for 16 hours, surface areas are measured (single point BET method). After calcining at 400° C., surface areas are again measured. Results are contained in Table I.

TABLE I

| Example | Molar Conc. Aqueous $NH_4OH$ | pH | Surface Area[1] b.c. | Surface Area[1] a.c. | Al/P[2] |
|---|---|---|---|---|---|
| * | 0 | 3.4 | 0.8 | 47[3] | 1 |
| 1 | 0.25 | 8.34 | 17.0 | 162 | 2.7 |
| 2 | 0.5 | — | 280.0 | 424 | 5.0 |
| 3 | 2.0 | 10.2 | 489.0 | 449 | 7.0 |
| 4 | 4.5 | 10.6 | 403.0 | 301 | 7.2 |
| 5 | 6.0 | 10.8 | 436.0 | 324 | 6.7 |
| 6 | 9.0 | 10.85 | 466.0 | 370 | 7.3 |
| 7 | 12.0 | 11.05 | 504.0 | 400 | 6.5 |
| 8 | 15.0 | 11.10 | 313.0 | 345 | 6.2 |

*Comparative
[1]Measured by single point BET before calcination (b.c.) and after calcination (a.c.) at 400° C. for 1 hour
[2]Molar Ratio
[3]Calcined at 300° C., 1 hour

EXAMPLE 9

Calculation of Pore Diameters

Samples of partially hydrolyzed and extracted alumino phosphate (prepared according to the procedure of Example 5) both calcined and uncalcined are analzyed by BET and Scanning Electron Microscopy (SEM) techniques to determine the relative pore size thereof. Results before calcination (max. 250° C. temperature exposure) indicate a particle size of about 10-50μ with a surface area of 609 m²/g and a pore volume of 0.32 cc/g. Calculation of average pore distribution using the parallel plate model (T plot) gives pores at 10, 12 and 16 Angstrom units. Using a hydraulic formula the average pore size is 10.5 A.

After calcination at 450° C., particles are found to belong in two groups, one having particle size from 10-50μ and one having particle size from 100-300μ. Surface area is 578 m²/g. Pore volume is 0.34 cc/g. Extended T plot calculation gives a pore distribution <10 A. Hydraulic formula gives an average pore size of 12 A.

Further calcining the sample in air at 450° C. for 215 hours indicated substantially no loss of surface area.

For purposes of calculating pore size by hydraulic formula, the method employed is that of F. C. Ciapetta et al., *Oil and Gas Journal*, 65, 88 (1967), e.g., $$\text{average pore diameter } A = \frac{(4 \times 10^4) \text{ pore volume (cc/g)}}{\text{surface area (m}^2\text{/g)}}$$

EXAMPLE 10

Catalytic Use

A small sample of calcined metallo phosphate prepared according to the process of Example 5 (0.5 g) is placed in a plug flow micro reactor. A mixture (1:1 by volume) of ethanol and water is passed through the reactor at a rate of 0.1 ml/min at 450° C. under helium atmosphere. Analysis of the reactor effluent by gas-liquid chromatography indicated >95 percent conversion of ethanol with over 90 percent selectivity to ethylene.

EXAMPLE 11

Highly Extracted Aluminum Phosphate

A gel is prepared by reacting aluminum tri-2-(n-butoxy)ethoxide (490 g) with $P_2O_5$ (80.4 g) in 500 ml of $CH_2Cl_2$. The mixture is refluxed until all $P_2O_5$ is consumed (~48 hours). A portion of the resulting mixture (66.5 g) is contacted with water thereby causing a precipitate. The precipitate is recovered and dried at 110° C. Some of the dried precipitate (15 g) is stirred in 200 ml of water for 24 hours, recovered and dried at 110° C. for 16 hours. A portion of the remaining sample (4 g) is treated with 40 ml of 6M $NH_4OH$ for 1.5 hours. The solid is recovered by filtration, washed with water three times and dried for 16 hours at 110° C. The resulting porous amorphous alumino phosphate had a surface area of 473 $m^2/g$. The solid is again treated with 6M $NH_4OH$, washed and dried for a total of 5 extractions. Surface area as measured by single point BET is 440 $m^2/g$. The ratio Al/P is about 13.1/1. The sample is calcined at 450° C. for 100 hours. After calcining, the surface area as measured by single point BET method is about 343 $m^2/g$. After calcining again at 800° C. for about 4 hours, the surface area is about 241 $m^2/g$.

EXAMPLE 12

A mixed metal porous amorphous metallo phosphate is prepared by the procedure of the present invention. Accordingly, titanium tetraisopropoxide (10 g) and aluminum tri-2-(n-butoxy)ethoxide (13.4 g) are mixed together in 200 ml of dry toluene under nitrogen atmosphere. Next, 13.3 g of the 2-(n-butoxy)ethoxy diester of diphosphoric acid (prepared in Example 1) are added dropwise over about 40 minutes with stirring. The resulting gelatinous product is stirred for 12 hours. The toluene is removed under reduced pressure leaving a viscous yellow oil.

The oil is added to 500 ml of water and the mixture vigorously stirred for about one hour. A fluffy white solid results that is isolated by filtration and washed twice with water (250 ml). The recovered amorphous solid has a surface area of about 0.74 $m^2/g$ (by BET analysis) and an elemental analysis Ti:Al:P of 1:1:2. Yield is 16 g.

A portion of the above product (15 g) is extracted by stirring in 500 ml of aqueous 6M $NH_4OH$ for one hour. The product is recovered by filtration, washed with two 500-ml aliquots of water and dried at 100° C. for about 16 hours. The amorphous porous product (4.43 g) has a surface area of about 313 $m^2/g$. Calcination at 550° C. in air for 3 hours gives a white solid (3.37 g) with a surface area of 210 $m^2/g$ (single pt BET method). The material is shown to be X-ray amorphous. Porosity data show a pore volume of 0.13 cc/g with narrow pore dispersion of about 10 A pore diameter. Calculation of pore diameter using hydraulic formula (as calculated in Example 13) gives a pore size of 10 A. Multiport BET calculation gives a surface area of 258 $m^2/g$. Particle size (by Scanning Electron Microscopy) is from 10–50 micron. Elemental analysis shows Ti:Al:P of 14:5:1.

EXAMPLES 13–19

According to the procedure of Example 12, additional mixed metallo phosphates are prepared. In all cases the metal isopropoxide is reacted with aluminum tri-2-(n-butoxy)ethoxide and the 2-(n-butoxy)ethoxy diester of diphosphoric acid in amounts to give a metal/Al/P ratio of 1/1/1 in the reaction mixture. Workup is conducted as outlined in Example 12. The resulting calcined porous amorphous solids are analyzed for surface area (single point BET method) and average pore diameter. Results are contained in Table II. The valence provided for the metal ions is the valence of the metal when reacted as the isopropoxide salt.

TABLE II

| Example | Metal (m) | Al/m | Surface Area $m^2/g$ | Average Pore Diameter (A) |
|---|---|---|---|---|
| 13 | $Cr^{+3}$ | 19.3 | 264 | 23 |
| 14 | $Cu^{+2}$ | — | 366 | — |
| 15 | $Fe^{+3}$ | 3.4 | 296 | 28 |
| 16 | $La^{+3}$ | 8.9 | 333 | 29 |
| 17 | $Ta^{+5}$ | 1.4 | 387 | 27 |
| 18 | $Ti^{+4}$ | 9.1 | 290 | 28 |
| 19 | $Zr^{+4}$ | 11.2 | 180 | 25 |

What is claimed is:

1. A process for preparing an amorphous, porous metallo phosphate wherein the metal is selected from the group consisting of Al, Ti, Ba, Zr, Hf, V, Nb, Ta, Cr, Mo, W, Mg, Sc, Cu, Fe, and mixtures thereof having average pore diameter (as determined by single point BET analysis) of from about 5 Angstroms to about 50 Angstroms comprising:

(1) forming a metallo-organo phosphate corresponding to the formula

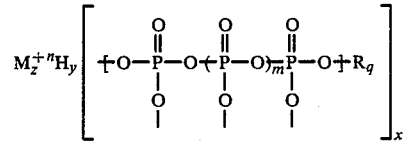

wherein M is a metallic species of valence n selected from the group consisting of Al, Ti, Ba, Zr, Hf, V, Nb, Ta, Cr, Mo, W, Mg, Sc, Cu, Fe, and mixtures thereof; R is a hydrolyzable organic moiety selected from the group consisting of remnants formed by removal of a hydroxyl group from a monohydroxyl compound selected from the group consisting of:

(a) (poly)alkylene glycol monoethers of up to about 20 carbons, (b) phenols, and (c) alcohols of up to about 20 carbons; and n, a, y, q and x are all integers, n being from zero to five, y being greater than zero, and q, x and z being greater than or equal to one, further selected such that $(z\ n)+y=x(m+y-q)$ and $q\pm m+3$;

(2) partially hydrolyzing the metallo-organo phosphate; and (3) extracting the partially hydrolyzed metallo-organo phosphate by contacting with aqueous base.

2. A process according to claim 1 wherein the extraction is performed by contacting with aqueous ammonium hydroxide solution.

3. A process according to claim 1 wherein the metallo-organo phosphate is partially hydrolyzed by contacting with water.

4. A process according to claim 1 wherein the metallo-organo phosphate is partially hydrolyzed such that after extraction at least 50 percent of the pore volume of the porous, amorphous metallo phosphate is attributed to pores having a diameter less than 30 Angstroms.

5. A process according to claim 4 wherein the metallo-organo phosphate is partially hydrolyzed such that after extraction at least 50 percent of the pore volumes of the porous, amorphous metallo phosphate is attributed to pores having a diameter less than 20 Angstroms.

6. A process according to claim 1 wherein the metallo-organo phosphate is an alumino-organo phosphate.

7. A process according to claim 1 wherein in the metallo-organo phosphate, R is lower alkyl or an alkoxy-substituted alkyl group of up to about 10 carbons.

* * * * *